(12) United States Patent
Sato et al.

(10) Patent No.: US 11,811,741 B2
(45) Date of Patent: Nov. 7, 2023

(54) INFORMATION PROCESSING SYSTEM AND INFORMATION PROCESSING METHOD

(71) Applicant: Hitachi, Ltd., Tokyo (JP)

(72) Inventors: Hisayoshi Sato, Tokyo (JP); Masayuki Yoshino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 64 days.

(21) Appl. No.: 17/466,554

(22) Filed: Sep. 3, 2021

(65) Prior Publication Data
US 2022/0103534 A1   Mar. 31, 2022

(30) Foreign Application Priority Data

Sep. 25, 2020   (JP) .................................. 2020-160436

(51) Int. Cl.
*H04L 9/14*   (2006.01)
*H04L 9/40*   (2022.01)
(Continued)

(52) U.S. Cl.
CPC ........ *H04L 63/0442* (2013.01); *H04L 9/0631* (2013.01); *H04L 9/14* (2013.01); *H04L 9/0894* (2013.01)

(58) Field of Classification Search
CPC . H04L 63/04; H04L 63/0442; H04L 63/0428; H04L 9/14; H04L 9/0631;
(Continued)

(56) References Cited

U.S. PATENT DOCUMENTS

| 4,567,600 A | 1/1986 | Massey et al. |
| 4,748,668 A | 5/1988 | Shamir et al. |

(Continued)

FOREIGN PATENT DOCUMENTS

| EP | 3338401 A1 | 6/2018 |
| WO | 2017053571 A1 | 3/2017 |

OTHER PUBLICATIONS

Michael J. Freedman, Kobbi Nissim, and Benny Pinkas, "Efficient Private Matching and Set Intersection", EUROCRYPT 2004: Advances in Cryptology-Eurocrypt 2004 pp. 1-19, LNCS, vol. 3027 (2004) (accessed at https://link.springer.com/content/pdf/10.1007%2F978-3-540-24676-3_1.pdf on Aug. 9, 2021).

(Continued)

*Primary Examiner* — Shaqueal D Wade-Wright
(74) *Attorney, Agent, or Firm* — Procopio, Cory, Hargreaves & Savitch LLP (57) ABSTRACT

A first terminal holds first encrypted data encrypted by using a first key by a first encryption scheme having deterministic and commutativity, a second terminal holds second encrypted data encrypted by using a second key by the first encryption scheme, the first terminal transmits the first encrypted data to the second terminal, the second terminal transmits the second encrypted data to the first terminal, the first terminal generates third encrypted data by encrypting the second encrypted data by using the first key by the first encryption scheme, the third encrypted data is transmitted to the second terminal, the second terminal decrypts the third encrypted data with the second key, and calculates a common part between the second encrypted data and the decrypted third encrypted data, and transmits the common part to the first terminal, and the first terminal decrypts the common part with the first key.

10 Claims, 9 Drawing Sheets

(51) Int. Cl.
*H04L 9/06* (2006.01)
*H04L 9/08* (2006.01)

(58) Field of Classification Search
CPC ....... H04W 12/12; H04W 12/02; G06F 21/62; G06F 21/6218; G06F 21/6245; G06F 21/6227; G06F 21/602
See application file for complete search history.

(56) References Cited

U.S. PATENT DOCUMENTS

| 9,740,877 | B2* | 8/2017 | Medvedev | H04W 12/12 |
| 2004/0223619 | A1* | 11/2004 | Jablon | H04L 9/0844 380/277 |
| 2017/0083717 | A1 | 3/2017 | Medvedev | |
| 2018/0013730 | A1* | 1/2018 | Ling | H04L 63/06 |
| 2021/0004864 | A1* | 1/2021 | Daub | H04W 12/02 |
| 2023/0053566 | A1* | 2/2023 | Horne | G06F 21/6227 |

OTHER PUBLICATIONS

Extended European Search Report dated Feb. 8, 2022 from counterpart EP Application No. 21192333.9, 10 pages.
Huberman et al., "Enhancing privacy and trust in electronic communities", Electronic Commerce, ACM, 2 Penn Plaza, Suite 701 New York NY 10121-0701 USA, Nov. 1, 1999 (Nov. 1, 1999), pp. 78-86.
Agrawal et al., "Information sharing across private databases", SIGMOD 2003. Proceedings of the ACM SIGMOD International Conference on Management of Data. San Diego, CA, Jun. 9-12, 2003; [Proceedings of the ACM SIGMOD International Conference on Management of Data], New York, NY : ACM, US, Jun. 9, 2003 (Jun. 9, 2003), pp. 86-97.
Lv et al., "Unbalanced private set intersection cardinality protocol with low communication cost", Future Generation Computer Systems, vol. 102, Sep. 18, 2020 (Sep. 18, 2020), pp. 1054-1061.
Office Action received in related JP Application No. 2020-160436, dated Jul. 6, 2023, in 11 pages, with translation.
"Three-pass protocol", Wikipedia, The Free Encyclopedia, https://en.wikipedia.org/w/index.php?title=Three-pass_protocol&oldid=1170463695, printed Aug. 29, 2023, in 3 pages.

* cited by examiner

INFORMATION PROCESSING SYSTEM AND INFORMATION PROCESSING METHOD

INCORPORATION BY REFERENCE

This application claims priority based on Japanese patent application, No. 2020-160436 filed on Sep. 25, 2020, the entire contents of which are incorporated herein by reference.

BACKGROUND

The present invention relates to an information processing system and an information processing method.

In recent years, big data analysis that extracts unknown and effective knowledge from enormous data has attracted attention. In addition, companies collect not only their own data but also external data and utilize the data for marketing and business efficiency, and various analyses of information are increasingly recognized as important activities. On the other hand, due to such incompleteness of data management, there have been frequent incidents and accidents in which a large amount of information including personal information of customers leaks, which have become a social problem.

A company that has caused such a leakage accident will bear a large amount of compensation money, and in some cases, this may be a matter of survival of the company. In addition, there is a concern that an unrelated company may also be adversely affected, for example, an individual who is an information owner hesitates at the time of providing information, as a result, it becomes difficult to collect information, and an effective analysis result cannot be obtained.

Therefore, recently, research on a technology that enables some processing without decryption while using a highly secure encryption technology has attracted attention. The technology can minimize disclosure of information and prevent leakage of unnecessary information by performing necessary processing while encrypting information of another person.

In particular, there is an increasing need to specify whether information held by a plurality of persons includes common information and to apply the information to analysis. For example, there is a need to share suspicious access information and share credit information for unauthorized access.

However, there are many cases where it is desired to share common information among pieces of information held by a plurality of persons, but it is not desired to notify others of information that is not common. There is a need for a safe technique for extracting only common part information without disclosing other than such common parts to each other.

As such a technique, there is a technique in which two parties from which a common part of information is to be extracted share the same encryption key, then their own data is encrypted, and the common part is extracted by comparing ciphertexts. However, in such a technique, information other than the common part is also encrypted and mutually transmitted. Therefore, after the common part extraction processing, an offline attack such as one guessing a keyword that is not included in the common part may be established, and information other than the common part may leak, and it cannot be said that the technique has high safety.

The technique described in "Efficient Private Matching and Set Intersection" (Michael J. Freedman, Kobbi Nissim, and Benny Pinkas, EUROCRYPT 2004: Advances in Cryptology-EUROCRYPT 2004 pp 1-19, LNCS, volume 3027, Internet <https://link.springer.com/content/pdf/10.1007%2F978-3-540-24676-3_1.pdf>) (hereinafter Non-Patent Literature 1) uses an encryption scheme called homomorphic public key encryption to encrypt a keyword possessed by one side and transmit the encrypted keyword to the other side, and the other side calculates a difference from the transmitted ciphertext of the keyword or a value similar to the difference while encrypting the difference, and returns the ciphertext as a result.

SUMMARY

However, in the technology described in Non-Patent Literature 1, it is considered that one can prevent the other from inferring the other keyword and has high safety, but the processing amount and the communication amount dramatically increase as the data amount increases, and thus it is difficult to perform processing with realistic time and cost.

Therefore, an object of one aspect of the present invention is to reduce a risk of leakage of information to others for data that is not common in extracting a common part of data of a plurality of data holders, and to execute processing with a small amount of calculation and a small amount of communication.

In order to solve the above problems, one aspect of the present invention adopts the following configuration. An information processing system includes a first terminal and a second terminal. The first terminal holds first encrypted data encrypted using a first key by a first encryption scheme. The second terminal holds second encrypted data encrypted using a second key by the first encryption scheme. The first encryption scheme satisfies deterministic that the same encrypted data is generated when the same plaintext is encrypted with the same key and commutativity that the same encrypted data is generated even if encryption using each of a plurality of keys is performed in an arbitrary order in a case where the same plaintext is multiplexed and encrypted with the plurality of keys. The first terminal transmits the first encrypted data to the second terminal. The second terminal transmits the second encrypted data to the first terminal. The first terminal is configured to: generate third encrypted data by encrypting the second encrypted data using the first key by the first encryption scheme; and transmit the third encrypted data to the second terminal. The second terminal is configured to: decrypt the third encrypted data with the second key; calculate a common part between the second encrypted data and the decrypted third encrypted data; transmit the common part to the first terminal; and the first terminal decrypts the common part with the first key.

According to an aspect of the invention, it is possible to reduce a risk of leakage of information to others for data that is not common in extracting a common part of data of a plurality of data holders, and to execute processing with a small amount of calculation and a small amount of communication.

The details of one or more implementations of the subject matter described in the specification are set forth in the accompanying drawings and the description below. Other features, aspects, and advantages of the subject matter will become apparent from the description, the drawings, and the claims.

DESCRIPTION OF THE EMBODIMENTS

Hereinafter, embodiments of the invention will be described on the basis of the drawings. In the present embodiment, the same components are denoted by the same reference numerals in principle, and repeated description will be omitted. It should be noted that the present embodiment is merely an example for realizing the present invention, and does not limit the technical scope of the present invention.

First Embodiment

Figure 1:
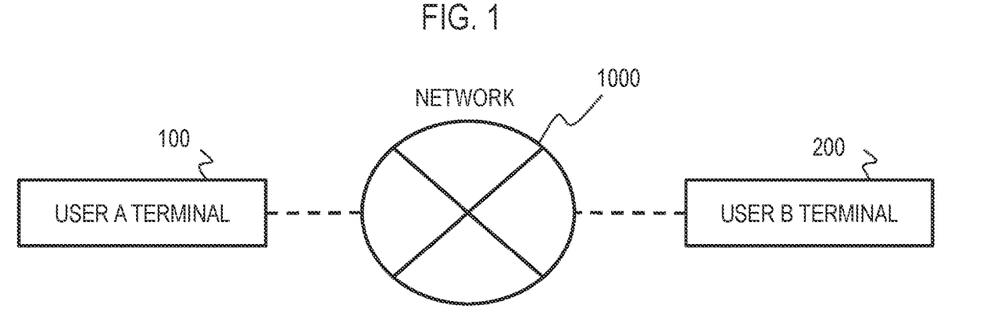
FIG. 1 is a block diagram illustrating a configuration example of a private set intersection calculation system according to a first embodiment.

FIG. 1 is a block diagram illustrating a configuration example of a private set intersection calculation system. A private set intersection calculation system in which one of two sides collates its own data with the other encrypted data while encrypting the own data and extracting a common part includes a user A terminal 100 and a user B terminal 200 connected to each other via a network 1000, and the user A terminal 100 and the user B terminal 200 are in a communicable state. The user A terminal 100 is a terminal owned by a user A, and the user B terminal 200 is a terminal owned by a user B.

Figure 2:
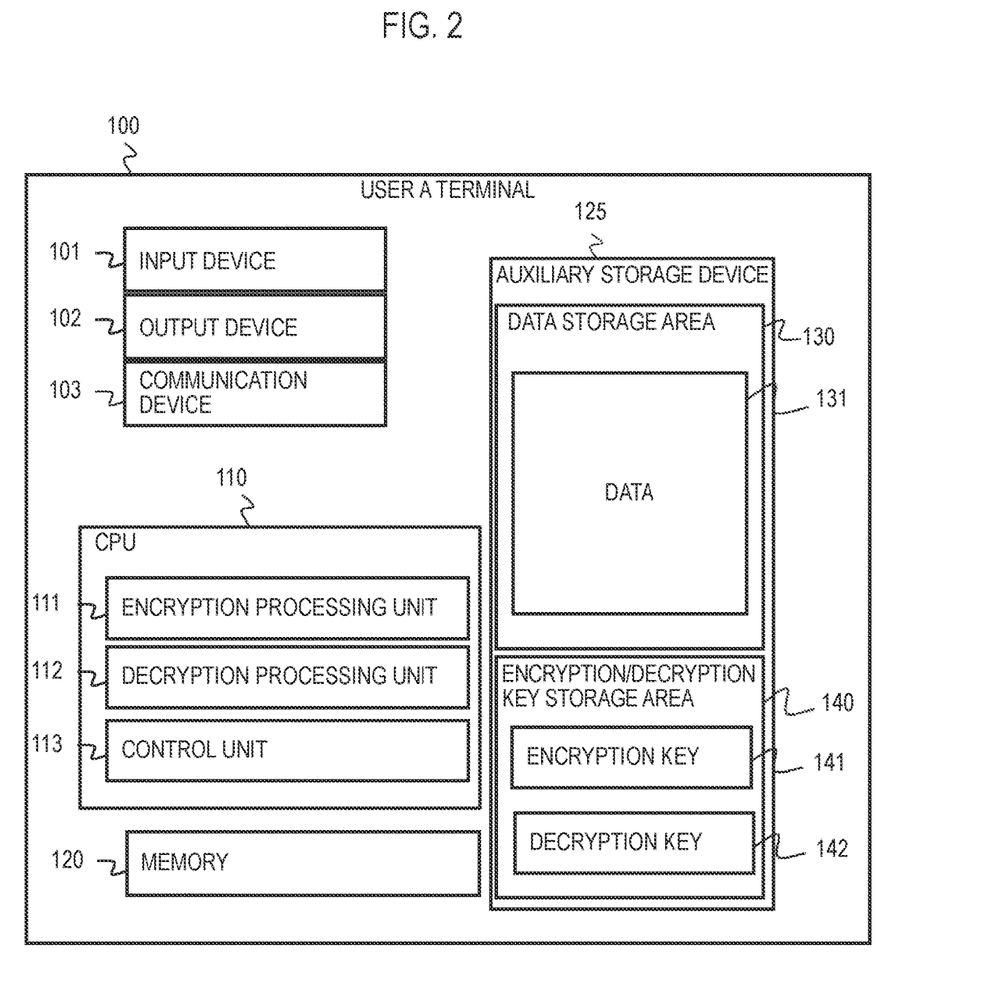
FIG. 2 is a block diagram illustrating a configuration example of a user A terminal according to the first embodiment.

FIG. 2 is a block diagram illustrating a configuration example of the user A terminal 100. The user A terminal 100 is configured by a computer which includes, for example, an input device 101, an output device 102, a communication device 103, a central processing unit (CPU) 110, a memory 120, and an auxiliary storage device 125.

The CPU 110 includes a processor and executes the program stored in the memory 120. The memory 120 includes a read only memory (ROM) that is a nonvolatile storage element and a random access memory (RAM) that is a volatile storage element. The ROM stores an invariable program (for example, basic input/output system (BIOS)) and the like. The RAM is a high-speed and volatile storage element such as a dynamic random access memory (DRAM), and temporarily stores a program executed by the CPU 110 and data used when the program is executed.

The auxiliary storage device 125 is, for example, a large-capacity and nonvolatile storage device such as a magnetic storage device (hard disk drive (HDD)) or a flash memory (solid state drive (SSD)), and stores a program executed by the CPU 110 and data used when the program is executed. That is, the program is read from the auxiliary storage device 125, loaded into the memory 120, and executed by the CPU 110.

The input device 101 is a device that receives an input from an operator, such as a keyboard or a mouse. The output device 102 is a device, such as a display device or a printer, that outputs the execution result of the program in a format that can be visually recognized by the operator.

The communication device 103 is a network interface device that controls communication with other devices according to a predetermined protocol. Further, the communication device 103 may include, for example, a serial interface such as a USB.

The program executed by the CPU 110 may be stored in advance in the non-volatile auxiliary storage device 125 that is a non-transitory storage medium, or may be provided to the user A terminal 100 from a removable medium (CD-ROM, flash memory, etc.) that is a computer-readable non-transitory storage medium or from a non-transitory storage device of another device via the network 1000 and stored in the auxiliary storage device 125. Therefore, the user A terminal 100 may have an interface for reading data from a removable medium.

The user A terminal 100 is a computer system configured on physically one computer or on a plurality of computers configured logically or physically, and may operate on separate threads on the same computer or may operate on a virtual computer constructed on a plurality of physical computer resources. The same applies to the user B terminal 200.

The CPU 110 includes an encryption processing unit 111 and a decryption processing unit 112. The encryption processing unit 111 encrypts the data 131 of the user A held by the user A terminal 100 and encrypts the data transmitted from the user B. The decryption processing unit 112 decrypts a common part between the data 131 of the user A extracted in the encrypted state and the user B data to be described later.

In addition, the CPU 110 includes a control unit 113 that performs processing of displaying data on the output device 102, reads data stored in the memory 120 or the auxiliary storage device 125, and transmits data to the user B terminal 200 via the communication device 103.

The auxiliary storage device 125 includes a data storage area 130 and an encryption/decryption key storage area 140. The data storage area 130 stores the data 131 of the user A, data transmitted from the user B terminal 200, and the like. The encryption/decryption key storage area 140 stores an encryption key 141 and a decryption key 142 used by the encryption processing unit 111 and the decryption processing unit 112.

Figure 3:
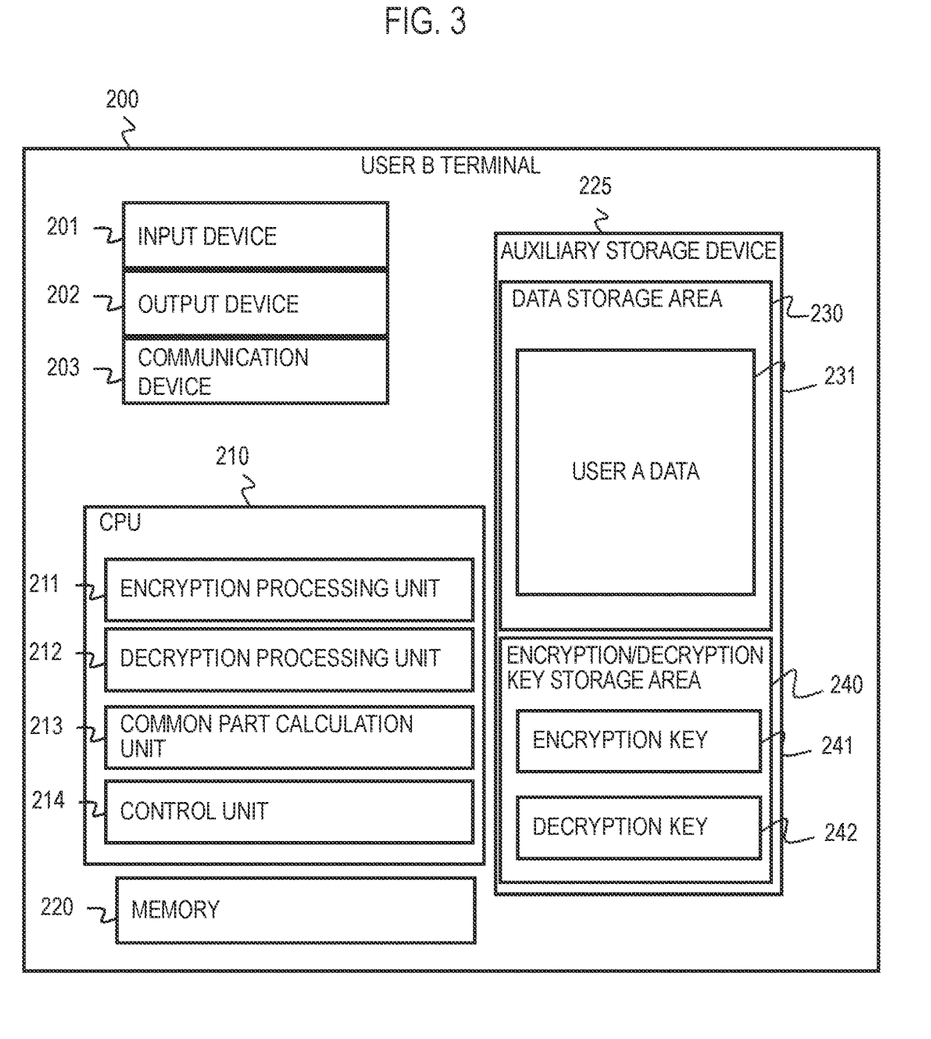
FIG. 3 is a block diagram illustrating a configuration example of a user B terminal in the first embodiment.

FIG. 3 is a block diagram illustrating a configuration example of the user B terminal 200. The user B terminal 200 is configured by a computer which includes, for example, a computer including an input device 201, an output device 202, a communication device 203, a CPU 210, a memory 220, and an auxiliary storage device 225.

The description of the input device 201, the output device 202, the communication device 203, the CPU 210, the memory 220, and the auxiliary storage device 225 as hardware is similar to the description of the input device 101, the output device 102, the communication device 103, the CPU 110, the memory 120, and the auxiliary storage device 125 as hardware, and thus, will be omitted.

The CPU 210 includes an encryption processing unit 211, a decryption processing unit 212, and a common part calculation unit 213. The encryption processing unit 211 encrypts the data 231 of the user B. The decryption processing unit 212 decrypts the encrypted data transmitted from the user A terminal. The common part calculation unit 213 calculates a common part between the encrypted data of the user A and the encrypted data of the user B.

Further, the CPU 210 may include a control unit 214 that performs processing similar to the processing of the control unit 113 included in the CPU 110 of the user A terminal 100.

The auxiliary storage device 225 includes a data storage area 230 and an encryption/decryption key storage area 240. The data storage area 230 stores the data 231 of the user B, the data transmitted from the user A terminal 100, and the like. The encryption/decryption key storage area 240 stores an encryption key 241 and a decryption key 242 necessary for processing in the encryption processing unit 211 and the decryption processing unit 212.

Figure 4:
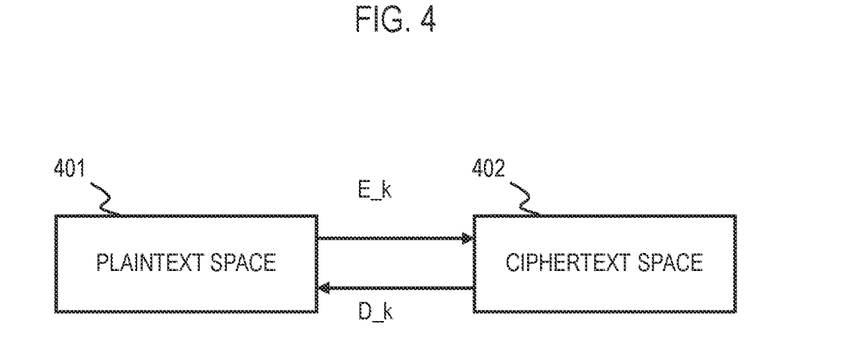
FIG. 4 is an explanatory diagram illustrating an example of an encryption scheme and a decryption scheme according to the first embodiment.

FIG. 4 is an explanatory diagram illustrating an example of an encryption scheme and a decryption scheme according to the present embodiment. When the encryption $E_k$ is performed on a plaintext belonging to the plaintext space 401 using the key k, the plaintext is converted into the ciphertext belonging to the ciphertext space 402.

When the ciphertext belonging to the ciphertext space 402 is subjected to decryption $D_k$, which is inverse transformation of the encryption $E_k$, the ciphertext is converted into a plaintext belonging to the plaintext space 401. The encryption $E_k$ has deterministic, that is, when the same plaintext is encrypted with the same key, the same ciphertext is always generated.

Figure 5:
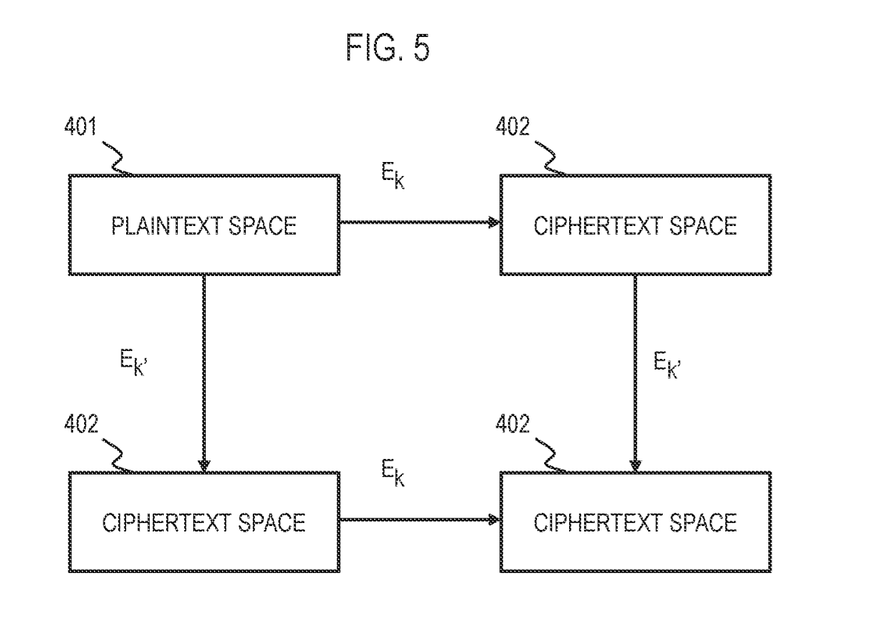
FIG. 5 is an explanatory diagram illustrating a property to be satisfied by the encryption scheme in the first embodiment.

FIG. 5 is an explanatory diagram illustrating a property to be satisfied by the encryption scheme of the present embodiment. In the encryption according to the present embodiment, for arbitrary two encryption keys k and k', a ciphertext obtained by performing the encryption $E_{k'}$ on a ciphertext obtained by first performing the encryption $E_k$ on an arbitrary plaintext included in the plaintext space 401 and a cipher obtained by performing the encryption $E_k$ on a ciphertext obtained by first performing the encryption $E_{k'}$ on the plaintext are always equal. That is, the encryption of the present embodiment satisfies the commutativity.

Figure 6:
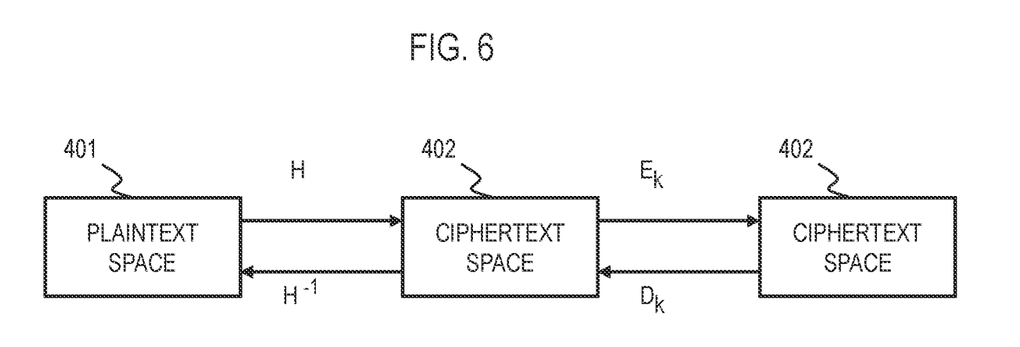
FIG. 6 is an explanatory diagram illustrating another example of the encryption scheme and the decryption scheme according to the first embodiment.

FIG. 6 is an explanatory diagram illustrating another example of the encryption scheme and the decryption scheme of the present embodiment. The plaintext belonging to the plaintext space 401 is subjected to transformation H (transformation by a key is not required), and the plaintext is converted into an origin belonging to the ciphertext space 402. Further, the transformation $E_k$ requiring the key k is applied to the origin, and the origin is converted into the ciphertext of the same ciphertext space 402. In the encryption scheme of FIG. 6, the output of $E_k$ is the ciphertext for the plaintext.

Further, when the inverse transformation $D_k$ of $E_k$ is performed on the ciphertext and then an inverse transformation $H^{-1}$ of H is further performed, the plaintext is restored.

Figure 7:
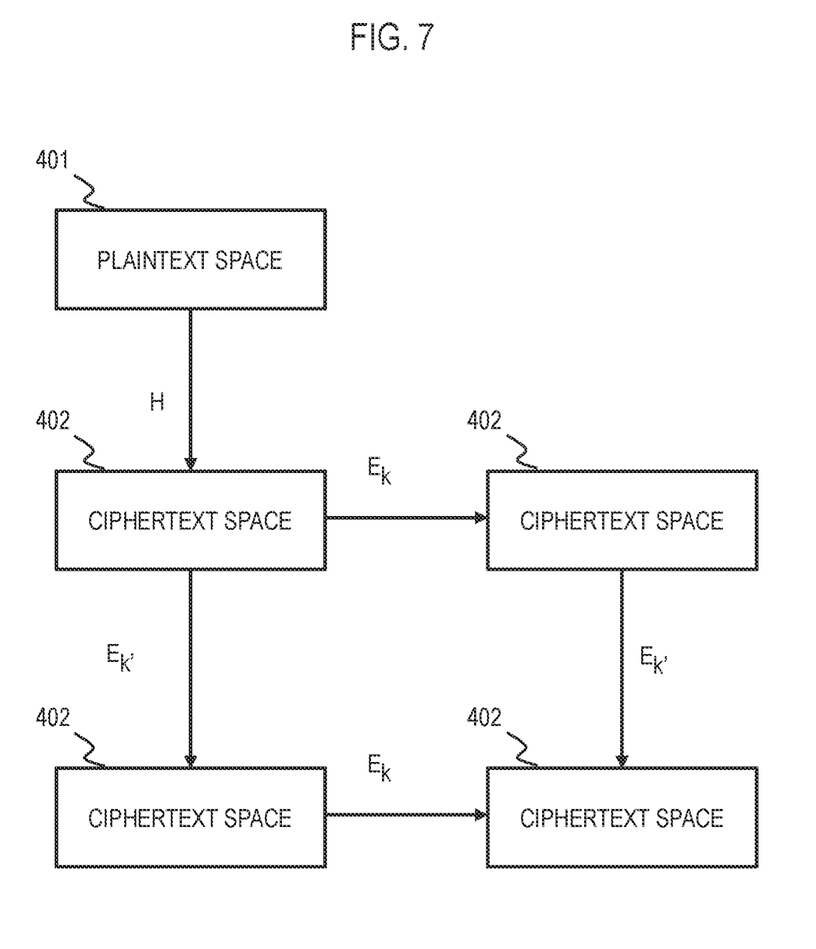
FIG. 7 is an explanatory diagram illustrating that another example of the encryption scheme according to the first embodiment satisfies commutativity.

FIG. 7 is an explanatory diagram illustrating that another example of the encryption scheme of the present embodiment (the encryption scheme of FIG. 6) satisfies the commutativity. In the encryption of the present embodiment, for arbitrary two encryption keys k and k', the transformation H is applied to an arbitrary plaintext included in the plaintext space 401, and the plaintext is converted into an origin included in the ciphertext space 402.

Further, the ciphertext obtained by applying the encryption $E_{k'}$ to the ciphertext obtained by applying the encryption $E_k$ to the origin is always equal to the ciphertext obtained by applying the encryption $E_k$ to the ciphertext obtained by applying the encryption $E_{k'}$ in advance to the origin obtained by converting the plaintext by the transformation H.

Figure 8:
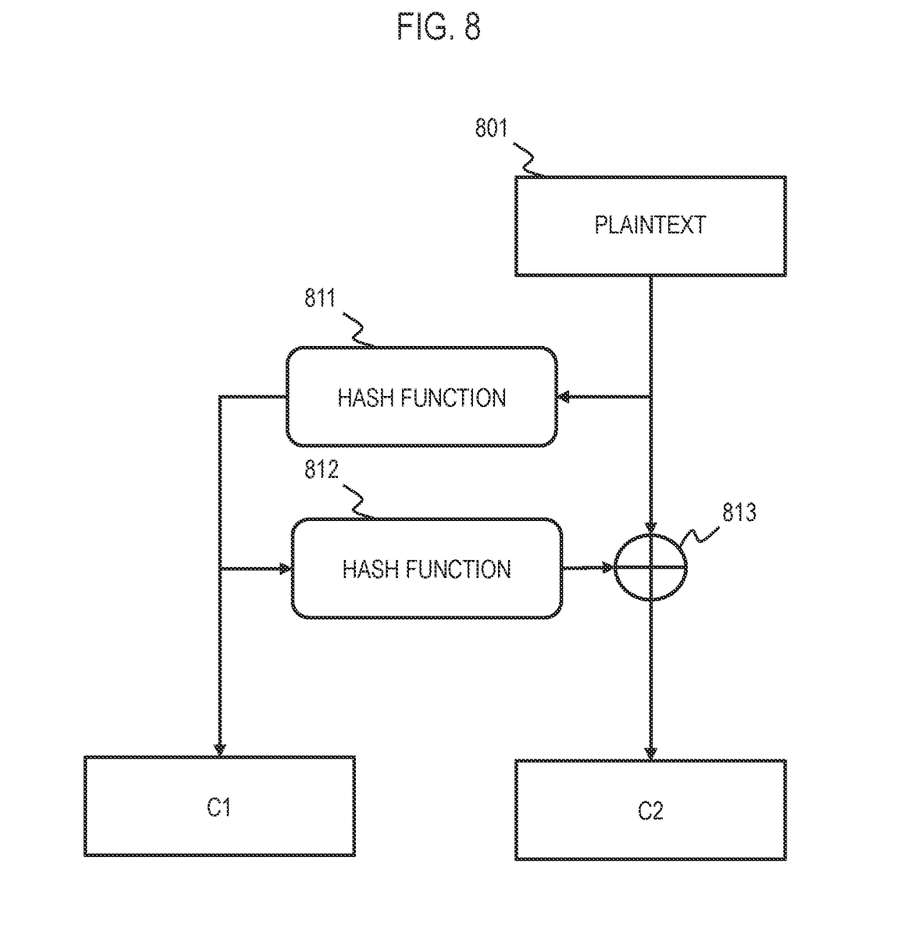
FIG. 8 is an explanatory diagram illustrating an example of transformation H from a plaintext space to a ciphertext space according to the first embodiment.

FIG. 8 is an explanatory diagram illustrating an example of the transformation H from the plaintext space 401 to the ciphertext space 402. An output when one plaintext 801 included in the plaintext space 401 is input to a hash function 811 is defined as C1. When the bit-wise exclusive OR of the output when C1 is input to the hash function 812 and the plaintext 801 is C2, the output by the transformation H of the plaintext 801 is defined by the combination of the bit strings C1 and C2. Note that the hash function 811 and the hash function 812 may be the same or different.

In the example of FIG. 8, when C1 and C2 are given, the plaintext 801 can be restored by taking the bit-wise exclusive OR of the output by the hash function 812 of C1 to C2. This procedure is an inverse transformation $H^{-1}$ of the transformation H.

Note that, in the present embodiment, as the ciphertext space 402, for example, a finite (commutative) group or the like in which it can be assumed that it is computationally intractable to solve the discrete logarithm problem is determined in advance. In a case where such a finite group is used as the ciphertext space 402, it is assumed that one method of regarding the bit string constituting data as the source of the finite group is fixed (since both the plaintext and the origin of the finite group are expressed by bit strings in the processing in the computer, the origin of the plaintext space and the origin of the finite group are associated with each other by determining the correspondence between the bit strings). In this case, it is possible to use an encryption method for obtaining a ciphertext by substituting the origin of the finite group associated with the bit string that is the plaintext into a mapping to be exponentiated by an exponent that is a key.

The fact that it is computationally intractable to solve the discrete logarithm problem indicates that, for example, in a case where a predetermined algorithm (for example, Baby-step Giant-step) is used, the probability that the discrete logarithm problem in G can be solved with a predetermined number of calculations (for example, 280 times) is a predetermined value (for example, ½ or less).

As a finite group that can be assumed to be computationally intractable to solve the discrete logarithm problem, for example, a group of rational points of an elliptic curve defined on a finite field is determined in advance. In this case, it is possible to use an encryption scheme in which the rational point of the elliptic curve associated with the bit string that is the plaintext is substituted into the mapping that is scalar-multiplied by a value of scalar that is the key to obtain the ciphertext.

Figure 9:
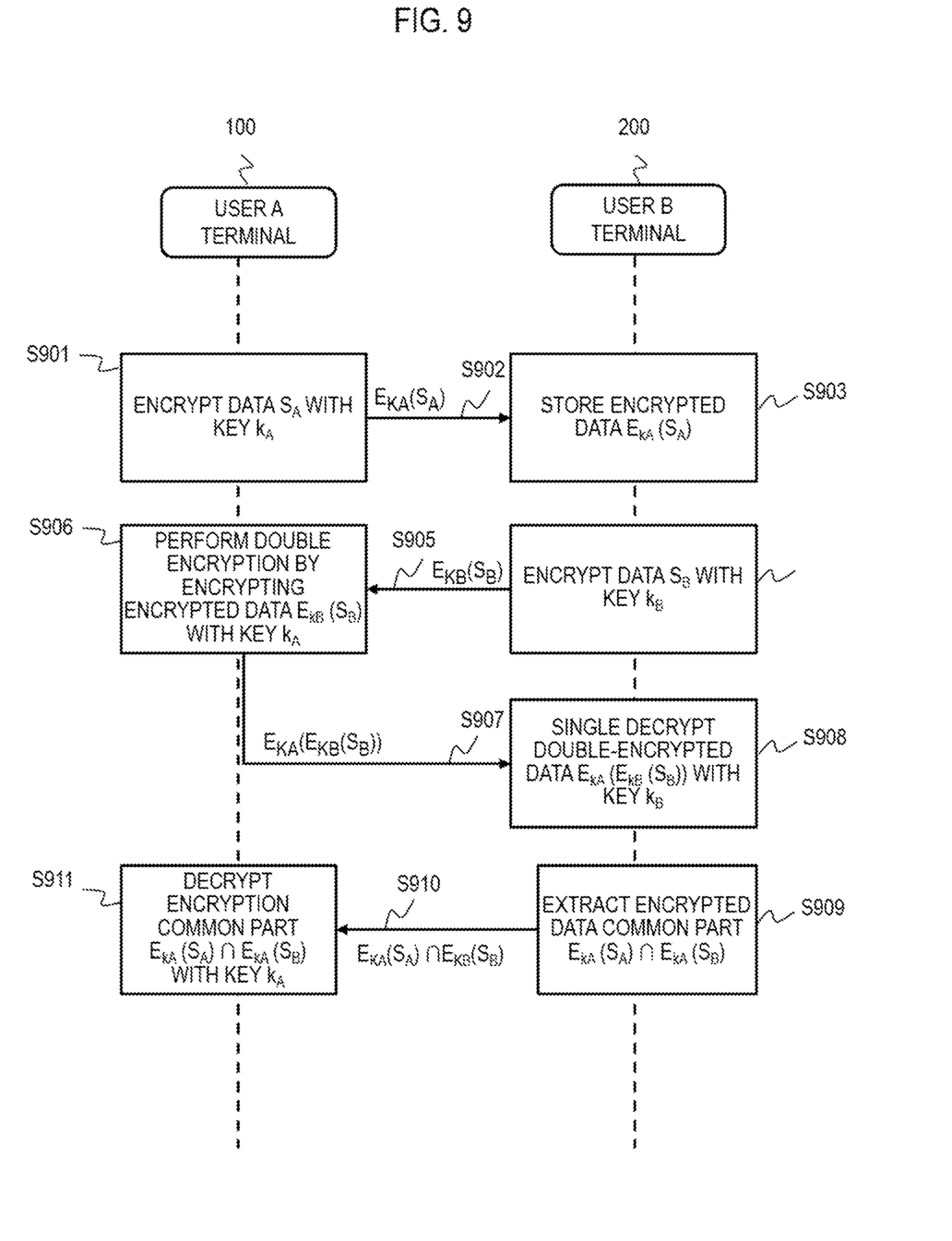
FIG. 9 is a flowchart illustrating an example of private set intersection calculation processing in the first embodiment.

FIG. 9 is a flowchart illustrating an example of the private set intersection calculation processing. In the private set intersection calculation processing, the user A terminal 100 and the user B terminal 200 perform communication by encrypting the respective data, and finally a common part of both pieces of data is extracted. Hereinafter, the data 131 held by the user A terminal 100 is also referred to as $S_A$, and the data 231 held by the user B terminal 200 is also referred to as $S_B$.

The encryption processing unit 111 of the user A terminal 100 generates encrypted data $E_{kA}(S_A)$ by encrypting the values ($a_1, a_2, \ldots, a_m$) included in $S_A$ by the encryption method illustrated in FIG. 4 or 6 using $k_A$ that is the encryption key 141 possessed by itself (S901).

The control unit 214 transmits the encrypted data $E_{kA}(S_A)$ to the user B terminal 200 (S902). The control unit 214 of the user B terminal 200 stores the received encrypted data $E_{kA}(S_A)$ of the user A in the data storage area 230 of the user B terminal 200 (S903).

The encryption processing unit 211 of the user B terminal 200 generates encrypted data $E_{kB}(S_B)$ by encrypting the values ($b_1, b_2, \ldots, b_n$) included in $S_B$ by the encryption method illustrated in FIG. 4 or 6 using $k_B$ that is the encryption key 241 possessed by itself (S904). The control unit 214 of the user B terminal 200 transmits the encrypted data $E_{kB}(S_B)$ to the user A terminal 100 (S905).

The encryption processing unit 111 of the user A terminal 100 generates encrypted data $E_{kA}(E_{kB}(S_B))$ by encrypting the received encrypted data $E_{kB}(S_B)$ of the user B using the key $k_A$ (S906). The control unit 113 transmits the encrypted data $E_{kA}(E_{kB}(S_B))$ to the user B terminal 200 (S907).

Note that the encryption processing unit 111 may change the order of the values included in $E_{kA}(E_{kB}(S_B))$ by, for example, random shuffling in Step S906. In this case, the user B terminal 200 cannot calculate the common part between the data 131 of the user A and the data 231 of the user B.

The decryption processing unit 212 of the user B terminal 200 decrypts $E_{kA}(E_{kB}(S_B))$ using $k_B$ that is its own decryption key 242 to obtain $D_{kB}(E_{kA}(E_{kB}(S_B)))$ (S908). As described in FIGS. 5 and 7, since the encryption scheme of the present embodiment has commutativity, $D_{kB}(E_{kA}(E_{kB}(S_B)))=D_{kB}(E_{kB}(E_{kA}(S_B)))=E_{kA}(S_B)$ is satisfied.

The common part calculation unit 213 of the user B terminal 200 calculates $E_{kA}(S_A)$ stored in the data storage area 230, $E_{kA}(S_B)$ obtained in Step S908, and the common part $E_{kA}(S_A) \cap E_{kA}(S_B)$ (S909). The control unit 214 transmits the common part $E_{kA}(S_A) \cap E_{kA}(S_B)$ to the user A terminal 100 (S910). Since the encryption scheme $E_k$ of the present embodiment has deterministic, ciphertexts obtained by encrypting the same plaintext with the same key are the same. That is, the common part calculation unit 213 can extract the ciphertext of the common part of the plaintext only by comparing the ciphertexts.

The decryption processing unit 112 of the user A terminal 100 decrypts the common part $E_{kA}(S_A) \cap E_{kA}(S_B)$ using kA that is its own decryption key 142 to obtain the common part $S_A \cap S_B$ of the plaintext data (S911). Note that the control unit 113 of the user A terminal 100 may notify the user B of the result of the common part calculation by sending the common part $S_A \cap S_B$ to the user B terminal 200.

Figure 10:
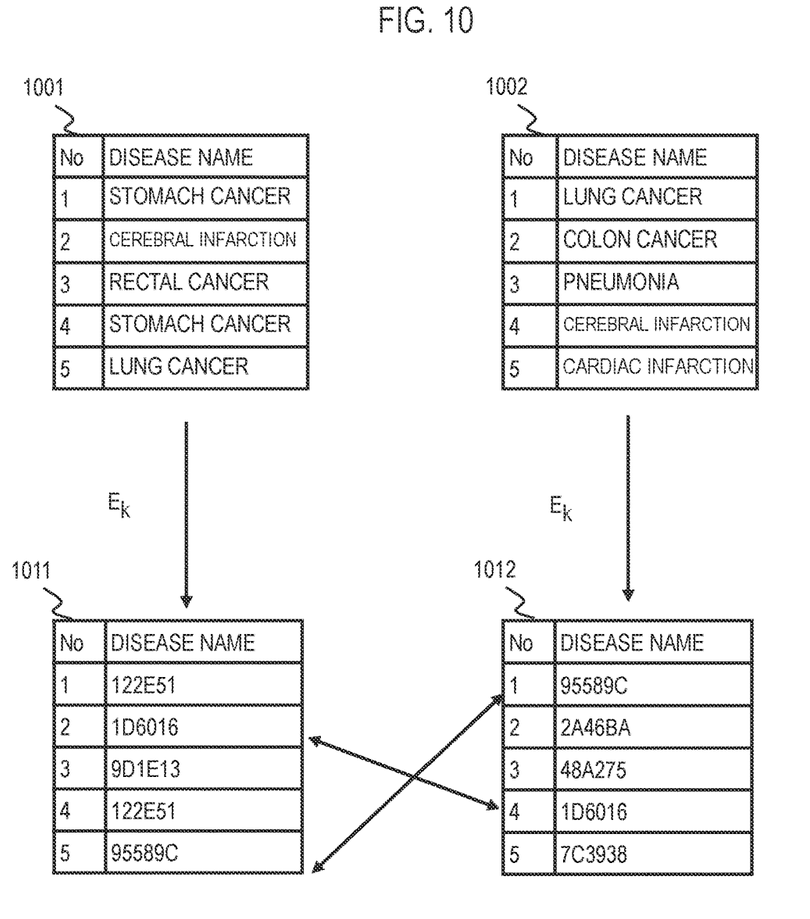
FIG. 10 is an explanatory diagram illustrating an outline example of comparison processing of common parts of ciphertext by the encryption scheme satisfying deterministic in the first embodiment.

FIG. 10 is an explanatory diagram illustrating a schematic example of comparison processing of common parts of ciphertext by an encryption scheme satisfying deterministic. The table 1001 and the table 1002 are encrypted by the deterministic encryption scheme $E_k$, and an encryption table 1011 and an encryption table 1012 are generated.

Since the table 1001 and the table 1002 are encrypted by the encryption scheme $E_k$ having deterministic, "cerebral infarction" of No. 2 of the table 1001 and "cerebral infarction" of No. 2 of data included in the table 1002 have the same value in "1D6016" of No. 2 of the encryption table 1011 and "1D6016" of No. 4 of the encryption table 1012. That is, by using an encryption scheme having deterministic, it is possible to determine whether common parts match even if the plaintext is not disclosed by comparing ciphertexts. The same applies to the value "stomach cancer" included in the table 1001 and the table 1002.

The private set intersection calculation system of the present embodiment calculates an encrypted common part by comparing ciphertexts using an encryption scheme having deterministic and commutativity, and decrypts the encrypted common part, so that the user A terminal 100 and the user B terminal 200 can acquire the common part of the plaintext without obtaining information of the plaintext of the other party other than the common part.

Second Embodiment

Figure 11:
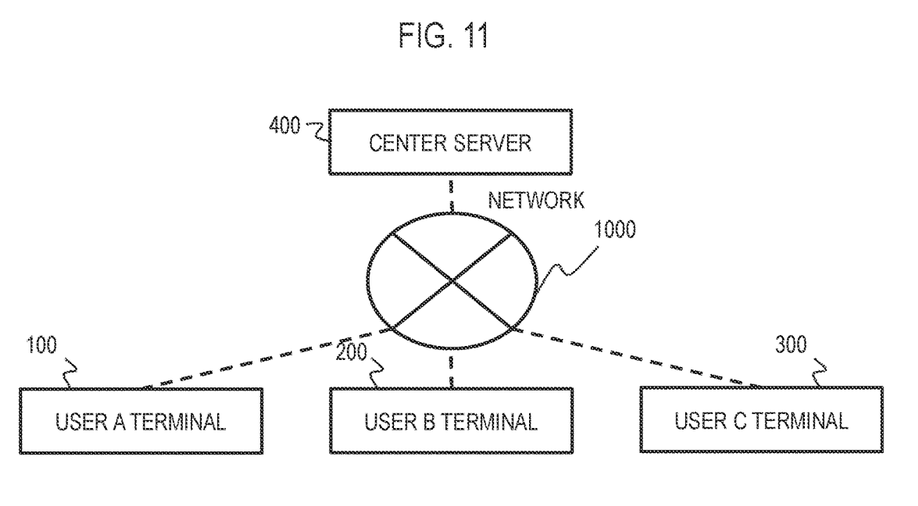
FIG. 11 is a block diagram illustrating a configuration example of a private set intersection calculation system according to a second embodiment.

Hereinafter, differences from the first embodiment will be described. FIG. 11 is a block diagram illustrating a configuration example of a private set intersection calculation system. In the private set intersection calculation system of the present embodiment, communication is performed between a plurality of user terminals and a center server via the network 1000, and a common part of data held by the plurality of user terminals is calculated. Although FIG. 11 illustrates an example in which the private set intersection calculation system includes three user terminals, the private set intersection calculation system may include four or more user terminals.

In the private set intersection calculation system, a center server 400, a user A terminal 100, a user B terminal 200, and a user C terminal 300 are connected via the network 1000. Each user terminal needs to be in a communicable state with the center server 400. Communication between the user terminals may not be possible.

The configuration of each of the user A terminal 100, the user B terminal 200, and the user C terminal 300 of the present embodiment is similar to, for example, the configuration example of the user A terminal 100 illustrated in FIG. 2 or the configuration example of the user B terminal 200 illustrated in FIG. 3. Further, the configuration of the center server 400 is, for example, similar to the configuration example of the user B terminal 200 illustrated in FIG. 3.

Figure 12:
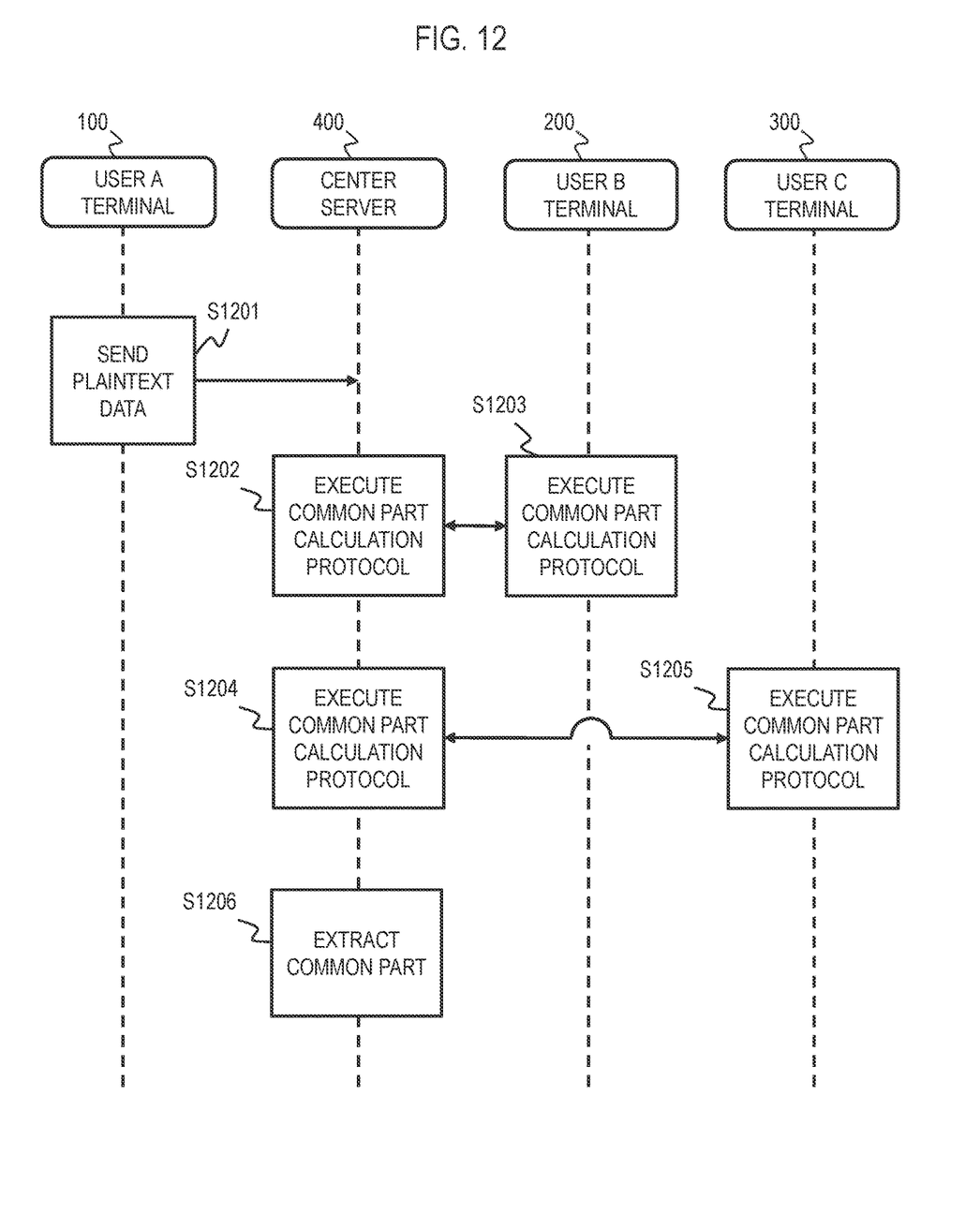
FIG. 12 is a flowchart illustrating an example of private set intersection calculation processing in the second embodiment.

FIG. 12 is a flowchart illustrating an example of the private set intersection calculation processing in the present embodiment. In the private set intersection calculation processing of FIG. 12, the user A terminal 100 calculates, through the center server 400, whether the data of the user A terminal has a common part between the data of the user B terminal 200 and the data of the user C terminal 300.

The control unit 113 of the user A terminal 100 transmits the data $S_A$ from which the common part is to be derived to the center server 400 in a plaintext. The center server 400 regards the plaintext data received from the user A terminal 100 as data owned by itself, and executes common protocol calculation processing with the user B terminal 200 (S1202, S1203).

Note that the common protocol calculation processing is processing of calculating the common part $S_A \cap S_B$ between the data $S_A$ received by the center server 400 from the user A terminal 100 and the data $S_B$ included in the user B terminal 200 by the method illustrated in FIG. 9 of the first embodiment.

The center server 400 regards the common part $S_A \cap S_B$ as its own data and executes common protocol calculation (S1204, S1205) with the user C terminal 300 to extract a common part $(S_A \cap S_B) \cap S_C$ of the common part $S_A \cap S_B$ and the data $S_C$ of the user C terminal 300 (S1206).

When the calculation of $S_A \cap S_B$ is unnecessary, the process of Step S911 may not be executed in the common protocol calculation processing of Steps S1202 and S1203. In addition, since the center server 400 receives $E_{kA}(S_A) \cap E_{kB}(S_B)$ in Step S910 of the common protocol calculation processing in Steps S1202 and S1203, the process in Step S901 of the common protocol calculation processing in Steps S1204 and S1205 may not be executed.

The center server 400 may transmit the common part $S_A \cap S_B \cap S_C$ to at least one of the user A terminal 100, the user B terminal 200, and the user C terminal 300 to share information.

By the processing of FIG. 12, the center server 400 obtains the plaintext data of the user A terminal 100, but can calculate the common part without knowing data other than the common part between the other user terminals.

Figure 13:
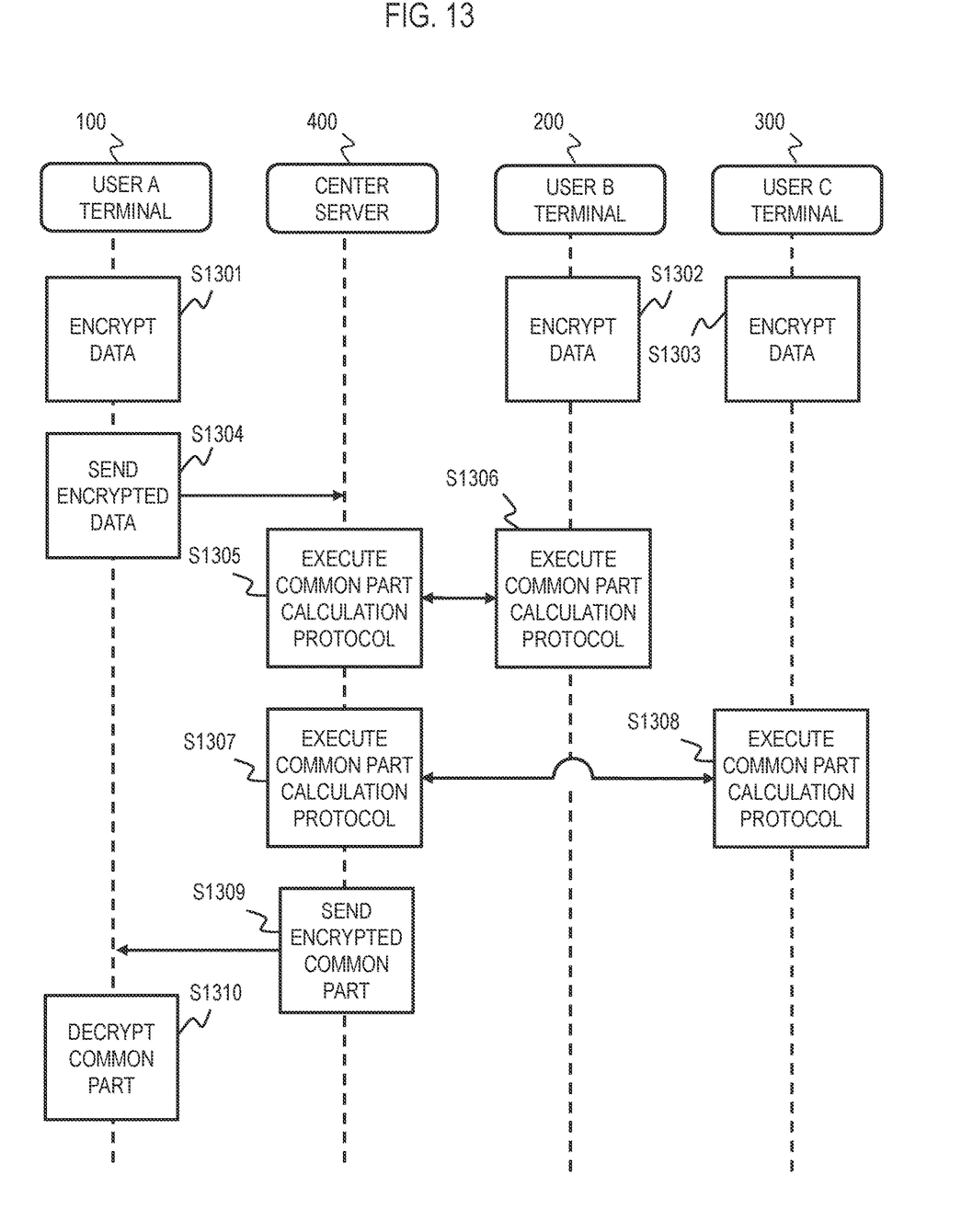
FIG. 13 is a flowchart illustrating an example of private set intersection calculation processing in the second embodiment.

FIG. 13 is a flowchart illustrating an example of the private set intersection calculation processing in the present embodiment. In the example of the private set intersection calculation processing in FIG. 13, the encryption key k used in the encryption scheme illustrated in FIG. 4 or FIG. 6 is shared in advance among the user A terminal 100, the user B terminal 200, and the user C terminal 300. For example, after a session key is shared between the user terminals by Diffie-Hellman key sharing, the encryption key k is shared by a method in which the key k selected by the user A terminal 100 is encrypted with the session key and transmitted to each user.

The encryption processing unit 111 of the user A terminal 100 encrypts its own data $S_A$ using the key k to generate $E_k(S_A)$ (S1301). The encryption processing unit 211 of the user B terminal 200 doubly encrypts its own data $S_B$ using the key k and the key $k_B$ which is its own encryption key 241 to generate $E_{kB}(E_K(S_B))$ (S1302).

The encryption processing unit of the user C terminal 300 doubly encrypts its own data $S_C$ using the key k and a key $k_C$ which is its own encryption key to generate $E_{kC}(E_K(S_C))$ (S1303). The control unit 113 of the user A terminal 100 transmits the encrypted data $E_k(S_A)$ to the center server 400 (S1304).

The center server 400 regards the encrypted data $E_k(S_A)$ received from the user A terminal 100 as its own data, and executes the common protocol calculation processing (S1305, S1306) illustrated in FIG. 6 of the first embodiment with the user B terminal 200 to calculate a common part $E_k(S_A) \cap E_k(S_B)$ of the encrypted data $Ek(S_A)$ and the encrypted data $Ek(S_B)$ held by the user B terminal 200.

The center server 400 regards the common part $E_k(S_A) \cap E_k(S_B)$ as its own data, and executes common protocol calculation processing (S1307, S1308) with the user C terminal 300, thereby calculating the common part $E_k(S_A) \cap E_k(S_B)$ and the common part $(E_k(S_A) \cap E_k(S_B)) \cap E_k(S_C)$ of the encrypted data $E_k(S_C)$ and m included in the user C terminal 300.

The center server 400 transmits the common part $E_k(S_A) \cap E_k(S_B) \cap E_k(S_C)$ to the user A terminal 100 (S1309), and the decryption processing unit 112 of the user A terminal 100 obtains the common part $S_A \cap S_B \cap S_C$ of the plaintext by decrypting it using the key k (S1310).

The control unit 113 of the user A terminal 100 may transmit the common part obtained in Step S1310 to at least one of the center server 400, the user B terminal 200, and the user C terminal 300 to share information. In Step S1309, the party to which the center server 400 transmits the encrypted common part may be any user having the key k, for example, the user B terminal 200 or the user C terminal 300.

When the calculation of $S_A \cap S_B$ is unnecessary, the process of Step S911 may not be executed in the common protocol calculation processing of Steps S1305 and S1306. In addition, since the center server 400 receives $E_{kA}(S_A) \cap E_{kB}(S_B)$ in Step S910 of the common protocol calculation processing in Steps S1305 and S1306, the process in Step S901 of the common protocol calculation processing in Steps S1307 and S1308 may not be executed.

With the processing of FIG. 13, it is possible to calculate the common part without knowing data other than the common part (even the center server 400).

Although the present disclosure has been described with reference to example embodiments, those skilled in the art will recognize that various changes and modifications may be made in form and detail without departing from the spirit and scope of the claimed subject matter.

For example, the above-described embodiments of the invention have been described in detail in a clearly understandable way, and are not necessarily limited to those having all the described configurations. In addition, some of the configurations of a certain embodiment may be replaced with the configurations of the other embodiments, and the configurations of the other embodiments may also be added to the configurations of the subject embodiment. It is possible to add, delete, and replace other configurations for a part of the configuration of each embodiment.

Each of the above configurations, functions, processing units, processing means, and the like may be partially or entirely achieved by hardware by, for example, designing by an integrated circuit. Each of the above configurations, functions, and the like may be achieved by software by a processor interpreting and executing a program that achieves each function. The information such as the programs, tables, files, and the like for realizing the respective functions can be placed in a recording device such as a memory, a hard disk, or an Solid State Drive (SSD), or a recording medium such as an IC card, an SD card, a DVD, or the like.

In addition, only control lines and information lines considered to be necessary for explanation are illustrated, but not all the control lines and the information lines for a product are illustrated. In practice, almost all the configurations may be considered to be connected to each other.

Although the present disclosure has been described with reference to example embodiments, those skilled in the art will recognize that various changes and modifications may be made in form and detail without departing from the spirit and scope of the claimed subject matter.

What is claimed is:

1. An information processing system comprising:
   a first terminal; and
   a second terminal, wherein
   the first terminal holds first encrypted data encrypted, by the first terminal by encrypting values of first data, using a first key by a first encryption scheme,
   the second terminal holds second encrypted data encrypted, by the second terminal by encrypting values of second data, using a second key by the first encryption scheme,
   the first encryption scheme satisfies deterministic that a same encrypted data is generated when a same plaintext is encrypted with the same key and commutativity that same encrypted data is generated even if encryption using each of a plurality of keys is performed in an arbitrary order in a case where the same plaintext is multiplexed and encrypted with the plurality of keys, wherein the first terminal and the second terminal are configured to sequentially perform following steps in order:

the first terminal transmits the first encrypted data to the second terminal, the second terminal stores the encrypted first data in a data storage area of the second terminal, the second terminal transmits the second encrypted data to the first terminal, the first terminal:

generates third encrypted data by encrypting the second encrypted data using the first key by the first encryption scheme; and transmits the third encrypted data to the second terminal, the second terminal:

decrypts the third encrypted data with the second key;

calculates a common part between the first encrypted data and the decrypted third encrypted data; and transmits the common part to the first terminal; and the first terminal decrypts the common part with the first key.

2. The information processing system according to claim 1, wherein in the first encryption scheme, a correspondence between each of plaintexts that are bit strings and an origin of a finite group determined in advance on a basis of a discrete logarithm problem is determined, and the origin of the finite group corresponding to the bit string of the plaintext is substituted into a mapping to be exponentiated by an exponent that is a key to generate a ciphertext.

3. The information processing system according to claim 1, wherein in the first encryption scheme, a correspondence between each of plaintexts that are bit strings and a rational point of an elliptic curve on a finite field determined in advance on a basis of a discrete logarithm problem is determined, and a rational point of the elliptic curve corresponding to the bit string of the plaintext is substituted into a mapping that is scalar-multiplied by a value of scalar that is the key to generate a ciphertext.

4. The information processing system according to claim 1, comprising:

a third terminal; and a fourth terminal, wherein the fourth terminal holds fourth encrypted data encrypted using a third key by the first encryption scheme, the first terminal generates the first encrypted data by encrypting a first plaintext received from the third terminal using the first key by the first encryption scheme, the first terminal transmits a common part to the fourth terminal, the fourth terminal transmits the fourth encrypted data to the first terminal, the first terminal is configured to:

generate fifth encrypted data by encrypting the fourth encrypted data using the first key by the first encryption scheme; and transmit the fifth encrypted data to the fourth terminal, the fourth terminal is configured to:

decrypt the fifth encrypted data with the third key;

calculate a common part between the fourth encrypted data and the decrypted fifth encrypted data; and transmit the common part between the fourth encrypted data and the decrypted fifth encrypted data to the first terminal, and the first terminal decrypts the common part between the fourth encrypted data and the decrypted fifth encrypted data with the first key.

5. The information processing system according to claim 1, comprising:

a third terminal; and a fourth terminal, wherein the third terminal encrypts a first plaintext by the first encryption scheme using a third key and transmits the encrypted first plaintext to the first terminal, the first encrypted data is data in which a first plaintext encrypted using the third key is further encrypted using the first key, the second encrypted data is multiplexed and encrypted using the third key and the second key by the first encryption scheme, the fourth terminal holds fourth encrypted data multiplexed and encrypted using the third key and a fourth key by the first encryption scheme, the first terminal transmits the common part to the fourth terminal, the fourth terminal transmits the fourth encrypted data to the first terminal, the first terminal is configured to:

generate fifth encrypted data by encrypting the fourth encrypted data using the first key by the first encryption scheme; and transmit the fifth encrypted data to the fourth terminal, the fourth terminal is configured to:

decrypt the fifth encrypted data with the third key;

calculate a common part between the fourth encrypted data and the decrypted fifth encrypted data; and transmit a common part between the fourth encrypted data and the decrypted fifth encrypted data to the first terminal, and the first terminal decrypts a common part between the fourth encrypted data and the decrypted fifth encrypted data with the first key and the third key.

6. An information processing method by an information processing system including a first terminal and a second terminal, wherein the first terminal holds first encrypted data encrypted, by the first terminal by encryption values of the first data, using a first key by a first encryption scheme, the second terminal holds second encrypted data encrypted, by the second terminal by encryption values of the second data, using a second key by the first encryption scheme, the first encryption scheme satisfies deterministic that same encrypted data is generated when a same plaintext is encrypted with the same key and commutativity that the same encrypted data is generated even if encryption using each of a plurality of keys is performed in an arbitrary order in a case where the same plaintext is multiplexed and encrypted with the plurality of keys, the information processing method comprising:

transmitting, by the first terminal, the first encrypted data to the second terminal;

storing the encrypted first data in a data storage area of the second terminal;

transmitting, by the second terminal, the second encrypted data to the first terminal;

generating, by the first terminal, third encrypted data by encrypting the second encrypted data using the first key by the first encryption scheme;

transmitting, by the first terminal, the third encrypted data to the second terminal;

decrypting, by the second terminal, the third encrypted data with the second key;

calculating, by the second terminal, a common part between the second first encrypted data and the decrypted third encrypted data;

transmitting, by the second terminal, the common part to the first terminal; and decrypting, by the first terminal, the common part with the first key.

7. The information processing method according to claim 6, wherein
in the first encryption scheme,
a correspondence between each of plaintexts that are bit strings and an origin of a finite group determined in advance on a basis of a discrete logarithm problem is determined, and
the origin of the finite group corresponding to the bit string of the plaintext is substituted into a mapping to be exponentiated by an exponent that is a key to generate a ciphertext.

8. The information processing method according to claim 6, wherein
in the first encryption scheme,
a correspondence between each of plaintexts that are bit strings and a rational point of an elliptic curve on a finite field determined in advance on a basis of a discrete logarithm problem is determined, and
a rational point of the elliptic curve corresponding to the bit string of the plaintext is substituted into a mapping that is scalar-multiplied by a value of scalar that is the key to generate a ciphertext.

9. The information processing method according to claim 6, wherein
the information processing system includes a third terminal and a fourth terminal, and
the fourth terminal holds fourth encrypted data encrypted using a third key by the first encryption scheme,
the information processing method comprising:
generating, by the first terminal, the first encrypted data by encrypting a first plaintext received from the third terminal using the first key by the first encryption scheme;
transmitting, by the first terminal, a common part to the fourth terminal;
transmitting, by the fourth terminal, the fourth encrypted data to the first terminal;
generating, by the first terminal, fifth encrypted data by encrypting the fourth encrypted data using the first key by the first encryption scheme;
transmitting, by the first terminal, the fifth encrypted data to the fourth terminal;
decrypting, by the fourth terminal, the fifth encrypted data with the third key;
calculating, by the fourth terminal, a common part between the fourth encrypted data and the decrypted fifth encrypted data;
transmitting, by the fourth terminal, the common part between the fourth encrypted data and the decrypted fifth encrypted data to the first terminal; and
decrypting, by the first terminal, the common part between the fourth encrypted data and the decrypted fifth encrypted data with the first key.

10. The information processing method according to claim 6, wherein:
the information processing system includes a third terminal and a fourth terminal,
the information processing method comprising
encrypting, by the third terminal, a first plaintext by the first encryption scheme using a third key and transmits the encrypted first plaintext to the first terminal, wherein
the first encrypted data is data in which a first plaintext encrypted using the third key is further encrypted using the first key,
the second encrypted data is multiplexed and encrypted using the third key and the second key by the first encryption scheme,
the fourth terminal holds fourth encrypted data multiplexed and encrypted using the third key and a fourth key by the first encryption scheme,
the information processing method comprising:
transmitting, by the first terminal, the common part to the fourth terminal;
transmitting, by the fourth terminal, the fourth encrypted data to the first terminal;
generating, by the first terminal, fifth encrypted data by encrypting the fourth encrypted data using the first key by the first encryption scheme;
transmitting, by the first terminal, the fifth encrypted data to the fourth terminal;
decrypting, by the fourth terminal, the fifth encrypted data with the third key;
calculating, by the fourth terminal, a common part between the fourth encrypted data and the decrypted fifth encrypted data;
transmitting, by the fourth terminal, a common part between the fourth encrypted data and the decrypted fifth encrypted data to the first terminal; and
decrypting, by the first terminal, a common part between the fourth encrypted data and the decrypted fifth encrypted data with the first key and the third key.

* * * * *